US012717324B2

(12) United States Patent
Kunz et al.

(10) Patent No.: US 12,717,324 B2
(45) **Date of Patent: *Aug. 25, 2026**

(54) NAUTICAL DRIFT MANAGING DEVICE AND NAUTICAL DRIFT MANAGING METHOD

(71) Applicant: Furuno Electric Co., Ltd., Nishinomiya (JP)

(72) Inventors: Eric R. Kunz, Camas, WA (US); Iker Pryszo, Beaverton, OR (US)

(73) Assignee: Furuno Electric Co., Ltd., Nishinomiya (JP)

( * ) Notice: Subject to any disclaimer, the term of this patent is extended or adjusted under 35 U.S.C. 154(b) by 49 days.

This patent is subject to a terminal disclaimer.

(21) Appl. No.: 18/911,004

(22) Filed: Oct. 9, 2024

(65) Prior Publication Data

US 2025/0036122 A1 Jan. 30, 2025

Related U.S. Application Data

(63) Continuation of application No. 17/449,382, filed on Sep. 29, 2021, now Pat. No. 12,117,835.

(51) Int. Cl.

| | |
|---|---|
| ***B63B 79/10*** | (2020.01) |
| ***B63B 49/00*** | (2006.01) |
| ***B63B 79/40*** | (2020.01) |
| ***G05D 1/00*** | (2006.01) |
| ***G05D 1/49*** | (2024.01) |
| ***G06F 3/14*** | (2006.01) |

(52) U.S. Cl.

CPC ........... *G05D 1/0206* (2013.01); *B63B 49/00* (2013.01); *B63B 79/10* (2020.01); *B63B 79/40* (2020.01); *G05D 1/49* (2024.01); *G06F 3/14* (2013.01)

(58) Field of Classification Search

CPC ......... B63B 34/05; B63B 79/10; B63B 49/00; B63B 79/40; B63B 2021/009; G05D 1/49; G05D 1/0206; G06F 3/14

See application file for complete search history.

(56) References Cited

U.S. PATENT DOCUMENTS 9,791,862 B1 * 10/2017 Connor ................ G05D 1/0875
10,407,136 B1 * 9/2019 Bak ...................... H05K 5/0247
12,117,835 B2 * 10/2024 Kunz ...................... G05D 1/49

(Continued)

OTHER PUBLICATIONS

Jose et al., Autonomous Navigation and Collision Avoidance Surface Watercraft for Flood Relief Operations, 2019, IEEE, p. 1-8 ( Year: 2019).*

(Continued)

*Primary Examiner* — Mcdieunel Marc

(74) *Attorney, Agent, or Firm* — Alleman Hall LLP

(57) ABSTRACT

A nautical drift managing device is provided. The nautical drift managing device includes an input circuitry to receive destination position information for a watercraft. Further, the nautical drift managing device includes a sensor circuitry to obtain external force information associated with the watercraft. Furthermore, the nautical drift managing device includes processing circuitry to determine, based on the destination position information and the external force information, a drift line associated with a drifting movement of the watercraft when an engine of the watercraft is stopped or neutral.

20 Claims, 11 Drawing Sheets

(56) References Cited

U.S. PATENT DOCUMENTS

| | | | | |
|---|---|---|---|---|
| 12,358,599 | B2 * | 7/2025 | Laster | B63B 49/00 |
| 2017/0365175 | A1 * | 12/2017 | Harnett | B63H 20/14 |
| 2019/0256178 | A1 * | 8/2019 | Grace | G06F 3/14 |
| 2023/0102473 | A1 * | 3/2023 | Kunz | B63B 79/40<br>701/21 |

OTHER PUBLICATIONS

Wang et al., A Survey of Technologies for Unmanned Merchant Ships, 2020, IEEE, p. 1-26 (Year: 2020).*

Pyrchla et al., Hydrographic Multisensory Unmanned Watercraft 2018, IEEE, p. 231-235 (Year: 2018).*

Tamiya et al., A simplified vibrotactile navigation system for sightseeing, 2011, IEEE, p. 33-36 (Year: 2011).*

* cited by examiner

NAUTICAL DRIFT MANAGING DEVICE AND NAUTICAL DRIFT MANAGING METHOD

CROSS-REFERENCE TO RELATED APPLICATION

This application is a continuation of U.S. patent application Ser. No. 17/449,382, entitled NAUTICAL DRIFT MANAGING DEVICE AND NAUTICAL DRIFT MANAGING METHOD, filed Sep. 29, 2021. This application is hereby incorporated by reference in its entirety for all purposes.

TECHNICAL FIELD

An example embodiment of the present disclosure generally relates to nautical navigation devices and more particularly relates to a nautical drift managing device for determining a drift line to enable drifting of a watercraft to reach a specific position.

BACKGROUND

Currently, various nautical navigation devices are available for assisting a user to navigate to a specific position such as a fishing spot, using a watercraft. These nautical navigation devices allow a user to set one or more waypoints and assist the user by providing navigation information while navigating to the one or more waypoints. For instance, the navigation information may include information about whether the watercraft is traveling in a correct direction or not to reach the fishing spot. However, these nautical navigation devices may not provide drift pattern information for the watercraft, which is an important aspect in a fishing application. Thereby, a burden of predicting drift patterns lies on the user such as a fisherman. Further, due to varying environmental conditions, the prediction made by the user may significantly vary from realistic conditions, which makes fishing more challenging.

SUMMARY

In order to solve the foregoing problem, it is an objective of present disclosure to determine drift patterns around a watercraft such that the burden, on the user, to predict the drift patterns is avoided. To this end, the present disclosure provides a nautical drift managing device and/or a nautical drift managing method.

According to one embodiment, the nautical drift managing device is provided. The nautical drift managing device may determine a drift line to enable drifting of a watercraft to reach a destination position such that the burden, on the user, to predict the drift patterns is avoided. The nautical drift managing device comprises: an input circuitry configured to receive destination position information for the watercraft; a sensor circuitry configured to obtain external force information associated with the watercraft; and processing circuitry configured to determine, based on the destination position information and the external force information, a drift line associated with a drifting movement of the watercraft when an engine of the watercraft is stopped or is in a neutral state.

According to another embodiment, the present disclosure provides a nautical drift managing method. The nautical drift managing method comprises receiving destination position information for a watercraft; obtaining external force information associated with the watercraft; and determining, based on the destination position information and the external force information, a drift line associated with a drifting movement of the watercraft when an engine of the watercraft is stopped or is in neutral state.

According to yet another embodiment, the present disclosure provides a non-transitory computer readable medium having stored thereon computer-executable instructions which, when executed by one or more processors, cause a computing device to perform a method that comprises: receiving destination position information for a watercraft; obtaining external force information associated with the watercraft; and determining, based on the destination position information and the external force information, a drift line associated with a drifting movement of the watercraft when an engine of the watercraft is stopped or is in a neutral state.

In accordance with various embodiments, the present disclosure proposes the nautical drift managing device that determines a drift line to enable drifting of the watercraft to reach the destination position such that the burden, on the user, to predict the drift patterns for the watercraft is avoided. In order to determine the drift line, the nautical drift managing device may include an input circuitry that is configured to receive destination position information for the watercraft and a sensor circuitry that is configured to obtain external force information associated with the watercraft. Further, the nautical drift managing device may include processing circuitry that is configured to determine, based on the destination position information and the external force information, the drift line associated with the drift movement of the watercraft, when the engine of the watercraft is stopped.

Furthermore, the processing circuitry may enable the nautical drift managing device to assist the user in fishing application by utilizing the determined drift line. To this end, the processing circuitry may be configured to determine a drift start position and an anchor drop position on the drift line. Furthermore, processing circuitry may reduce a burden, on the user, to control a rudder of the watercraft to reach the drift start position from a current position of the watercraft. To this end, the processing circuitry may be configured to control the rudder of the watercraft to reach the drift start position. Furthermore, the processing circuitry improves efficiency of the nautical drift managing device. To this end, the processing circuitry may determine, based on the determined drift line, a new drift line regardless of the external force information, when the nautical drift managing device receives new destination position information. Furthermore, the processing circuitry may ensure that the watercraft accurately reaches a new destination position while the watercraft is drifting on the new drift line. Further, the processing circuitry may determine the position error information and determine a modified drift line that replaces the new drift line based on the position error information. For instance, when the watercraft drifts along the modified drift line that replaces the new drift line, the watercraft may reach the new destination position accurately.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The present disclosure is illustrated by way of example and not by way of limitation in the FIGURES of the accompanying drawings, in which the like reference numerals indicate like elements and in which.

DETAILED DESCRIPTION

Figure 1A:
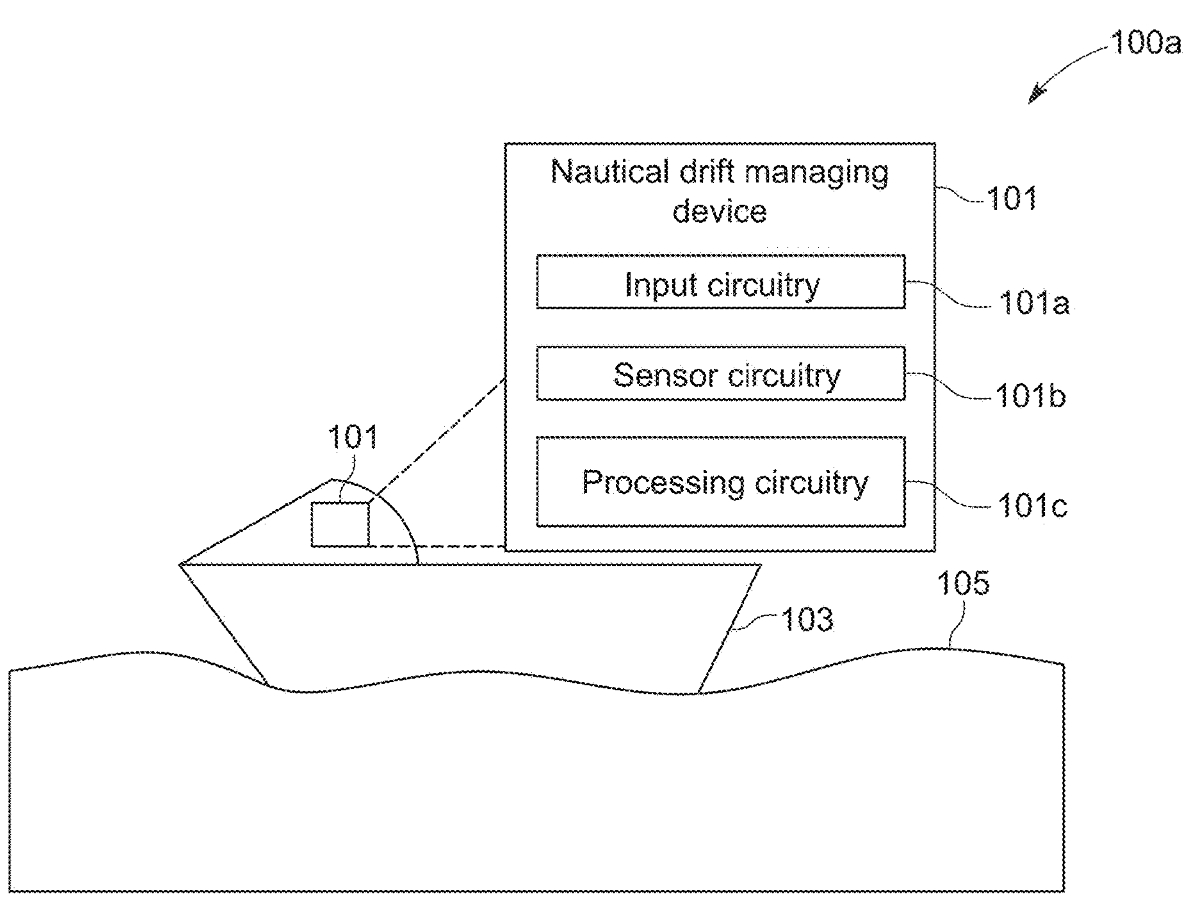
FIG. 1A illustrates a working environment of a nautical drift managing device, in accordance with an example embodiment of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Further, the terms "processor", "controller" and "processing circuitry" and similar terms may be used interchangeably to refer to the processor capable of processing information in accordance with embodiments of the present disclosure. Further, the terms "electronic equipment", "electronic devices" and "devices" are used interchangeably to refer to electronic equipment monitored by the system in accordance with embodiments of the present disclosure. Thus, use of any such terms should not be taken to limit the spirit and scope of embodiments of the present disclosure.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

As used in this specification and claims, the terms "for example" "for instance" and "such as", and the verbs "comprising," "having," "including" and their other verb forms, when used in conjunction with a listing of one or more components or other items, are each to be construed as open ended, meaning that that the listing is not to be considered as excluding other, additional components or items. Other terms are to be construed using their broadest reasonable meaning unless they are used in a context that requires a different interpretation.

One of the objectives of the present disclosure is to determine a drift line such that a burden, on a user, to predict drift patterns is avoided. To this end, a nautical drift managing device is provided. To determine the drift line, the nautical drift managing device may include an input circuitry that is configured to receive destination position information for a watercraft and a sensor circuitry that is configured to obtain external force information associated with the watercraft. Further, the nautical drift managing device may include processing circuitry that is configured to determine, based on the destination position information and the external force information, the drift line associated with the drift movement of the watercraft, when the engine of the watercraft is stopped or is in neutral state. Further, it is an objective of the present disclosure to assist the user in fishing application by determining a drift start position and an anchor drop position on the determined drift line. Furthermore, it is an objective of the present disclosure to reduce a burden, on the user, to control a rudder of the watercraft to reach the drift start position from a current position of the watercraft. Furthermore, it is an objective of the present disclosure to improve efficiency of the nautical drift managing device, by determining, based on the determined drift line, a new drift line regardless of the external force information, when the nautical drift managing device receives new destination position information. It is also an objective of the present disclosure to ensure that the watercraft reaches the new destination position accurately while drifting on the new drift line, by determining the position error information and determining a modified drift line that replaces the new drift line based on the position error information. The nautical drift managing device when operated in a manner described in the various embodiments disclosed herein, also provides a noise-free and fuel-efficient way to reach the destination position while fishing using the watercraft. The noise-free operation of the watercraft is possible due to the accurate drifting motion of the watercraft, as provided in various embodiments described herein, and helps in fishing without alerting the fish due to sound of the watercraft. This leads to better user (such as a fisherman) experience for the fishing and related applications described herein.

For instance, a working environment of the nautical drift managing device for determining the drift line is provided below with reference to FIG. 1A.

FIG. 1A illustrates a working environment 100*a* of a nautical drift managing device 101, in accordance with an example embodiment of the present disclosure. According to an embodiment, the nautical drift managing device 101 may be installed at a watercraft 103. For example, the watercraft 103 may be traversing in a waterbody 105. For instance, the watercraft 103 may include at least one of a vessel, a boat, a ship, or the like. According to an embodiment, the nautical drift managing device 101 may assist a user in fishing applications. For instance, the nautical drift managing device 101 may assist the user to catch fishes in an efficient manner. The user may correspond to a fisher man, a captain, a navigation officer, a driver, a traveler, and the like.

According to an embodiment, the nautical drift managing device 101 may include an input circuitry 101*a*, a sensor circuitry 101*b*, and processing circuitry 101*c*. According to an embodiment, the input circuitry 101*a* may be configured to receive destination position information for the watercraft 103. In an example embodiment, the destination position information may indicate a destination position (or a destination point). For instance, the destination position may be a 'Fish-it point' (i.e., a position for fishing). The input circuitry 101*a* may be embodied as one or more of a keyboard, a mouse, a touch panel, a touch screen, and/or any other know input technology prevalent in the art.

Some embodiments are based on the realization that even if an engine of the watercraft 103 is turned-off while traversing in the waterbody 105, the watercraft 103 may be subjected to a movement (also referred to as a drift movement) under influence of at least one external force. To this end, in an embodiment, the sensor circuitry 101*b* may be configured obtain external force information associated with the watercraft 103. In an example embodiment, the external force information may indicate information about the at least one external force exerted on the watercraft 103. The at least one external force may include at least one of tidal force, wind force, and the like. The sensor circuitry 101*b* may be a sensor node (e.g., a circuitry) that includes a sensing unit, a communicating unit, and a processing unit (e.g., a processor). The sensing unit may be embodied as at least one of a position detection circuitry (e.g., a GPS (Global positioning system)), a heading sensor, an anemometer, a tide gauge, a tidal current indicator, and/or the like. In some implementations, the anemometer and the tide gauge may be associated with the watercraft 103. The communicating unit may be embodied as a transceiver (e.g., RF (radiofrequency) transceiver, or the like). In one embodiment, the transceiver may be configured to communicate to processing circuitry 101*c*, the external force information obtained from the sensing unit (e.g., the anemometer, the tide gauge, the tidal current indicator, and/or the like). In another embodiment, the transceiver may be configured to communicate to processing circuitry 101*c*, the external force information obtained from one or more sensing devices that are located outside the watercraft 103. For instance, the external information obtained from the one or more sensing devices may be a calculation result determined from an ocean model.

According to an embodiment, the processing circuitry 101*c* may be configured to determine, based on the destination position information and the external force information, a drift line associated with the drift movement of the watercraft 103 when the engine of the watercraft is turned-off (or stopped) or is in a neutral state. The neutral state of the engine may correspond to a state when the engine is still on, but is not actively being used for navigation, and consequently there is no noise or excessive fuel consumption by the watercraft, when the engine is in the neutral state. The processing circuitry 101*c* may be embodied as a processor. The processor (or processing circuitry) may include one or more of a microprocessor, a coprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Hereinafter, 'processing circuitry' and 'drift managing circuitry' may be interchangeably used to mean the same.

Here for purpose of explanation, the navigation drift managing device 101 comprising the input circuitry 101*a*, the sensor circuitry 101*b*, and the processing circuitry 101*c* is considered. However, the navigation drift managing device 101 may further include additional modules along with the input circuitry 101*a*, the sensor circuitry 101*b*, and the processing circuitry 101*c*. For instance, a detailed block diagram of the nautical drift managing device 101 is as explained in the detailed description of FIG. 1B.

Figure 1B:
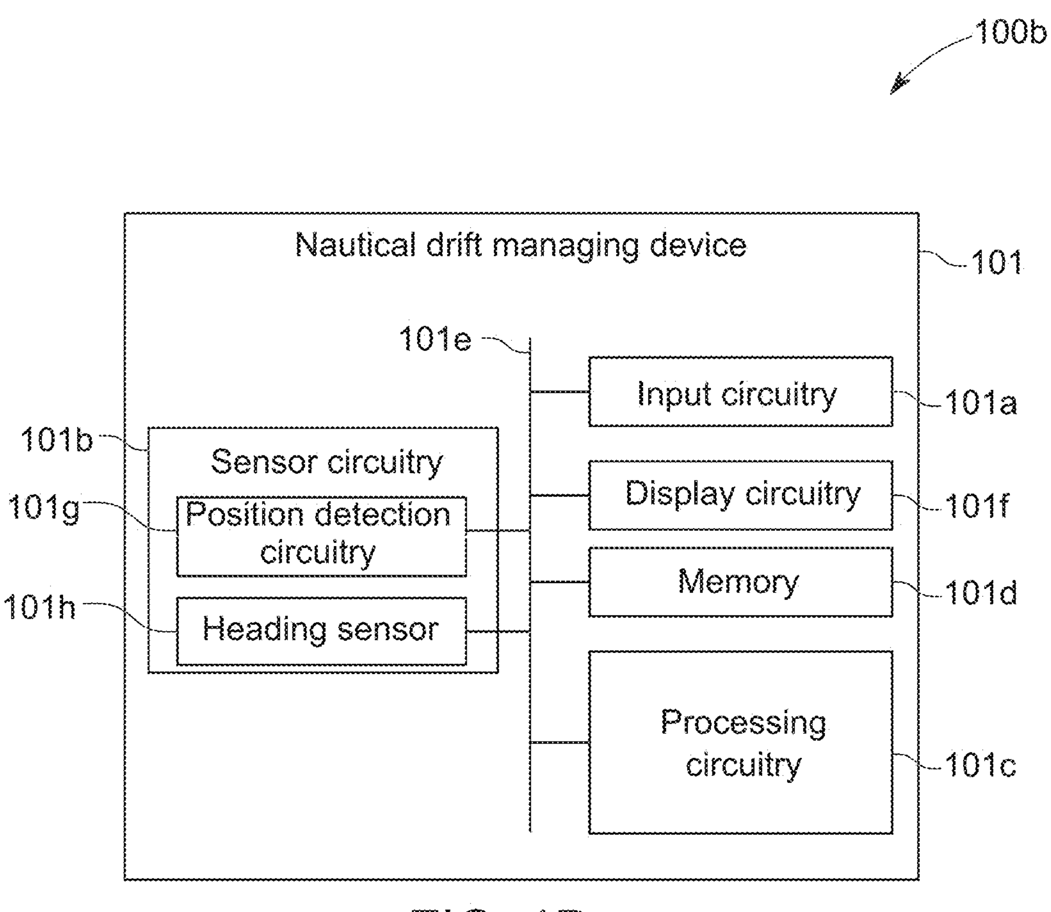
FIG. 1B illustrates a detailed block diagram of the nautical drift managing device, in accordance with an example embodiment of the present disclosure.

FIG. 1B illustrates a detailed block diagram 100*b* of the nautical drift managing device 101, in accordance with an example embodiment of the present disclosure. FIG. 1B is explained in conjunction with FIG. 1A. The nautical drift managing device 101 may include the input circuitry 101*a*, the sensor circuitry 101*b*, the processing circuitry 101*c*, a memory 101*d*, a bus 101*e*, and a display circuitry 101*f*. For instance, the input circuitry 101*a* may be configured to receive the destination position information for the watercraft 103. For instance, the sensor circuitry 101*b* may be configured to obtain the external force information associated with the watercraft 103. For instance, the processing circuitry 101*c* may be configured to determine the drift line associated with the drift movement of the watercraft 103.

The sensor circuitry 101*b* may include, but is not limited to, a position detection circuitry 101*g* and a heading sensor 101*h* as the sensing unit. In an example embodiment, the position detection circuitry 101*g* may be configured to identify a location (also referred to as a position) of the nautical drift managing device 101. In other words, the position detection circuitry 101*g* may be configured to identify the location of the watercraft 103, as the nautical drift managing device 101 is associated with the watercraft 103. In an example embodiment, the heading sensor 101*h* may be configured to identify a heading direction of the watercraft 103. The sensor circuitry 101*b* may further include the anemometer, the tide gauge, and the tidal current indicator. The anemometer may be configured to obtain wind force information around the watercraft 103. For instance, the wind force information may include a wind direction, a wind speed, and the like. The tide gauge may be configured to obtain tidal force information around the watercraft 103. For instance, the tidal force information may include information about changes in a water level in comparison a reference water level. The tidal current indicator may be configured to obtain tidal force information around the watercraft 103. The tidal force information obtained from the tidal current indication may include information about a speed and a direction of tidal currents. Here for purpose of explanation, the anemometer for obtaining the wind force information is considered, however, the anemometer may be replaced with any other known device for obtaining the wind force information. Here for purpose of explanation, tide gauge and/or the tidal current indicator for obtaining the tidal force information are considered, however, the tide gauge and/or the tidal current indicator may be replaced with any other know device for obtaining the tidal force information.

The memory 101*d* may be configured to store a nautical drift managing method associated with the nautical drift managing device 101. Further, the memory 101*d* may be configured to buffer data for enabling the nautical drift managing device 101 to carry out various functions in accordance with an example embodiment of the present disclosure. Furthermore, the memory 101*d* may be configured to store a nautical chart in an electronic format. As used herein, the nautical chart may include a graphical representation of a sea area or an area around and including the waterbody 105 and adjacent coastal regions. Additionally, the memory 101*d* may also store chart information associated with the nautical chart. For instance, the chart information may include depth information of the waterbody 105, height information of a land, seabed information, nautical navigation hazards information, and the like. The memory 101*d* may be embodied as a storage media such as a ROM (Read Only Memory), a RAM (Random Access Memory), a hard disk drive, or the like. In an example embodiment, each of the input circuitry 101*a*, the sensor circuitry 101*b*, the memory 101*d*, and the display circuitry 101*f* may be connected to the processing circuitry 101*c* via the bus 101*e*.

According to an embodiment, the display circuitry 101*f* may be configured to display the nautical chart to the user. The input circuitry 101*a* may be configured to receive, from the user, the destination position information for the watercraft 103 on the displayed nautical chart. To this end, in an example embodiment, the display circuitry 101*f* and the input circuitry 101*a* may be embodied within the touch screen. For instance, for enabling the user to set the destination position, the display circuitry 101*f* may display the nautical chart as explained in the detailed description of FIG. 2A.

Figure 2A:
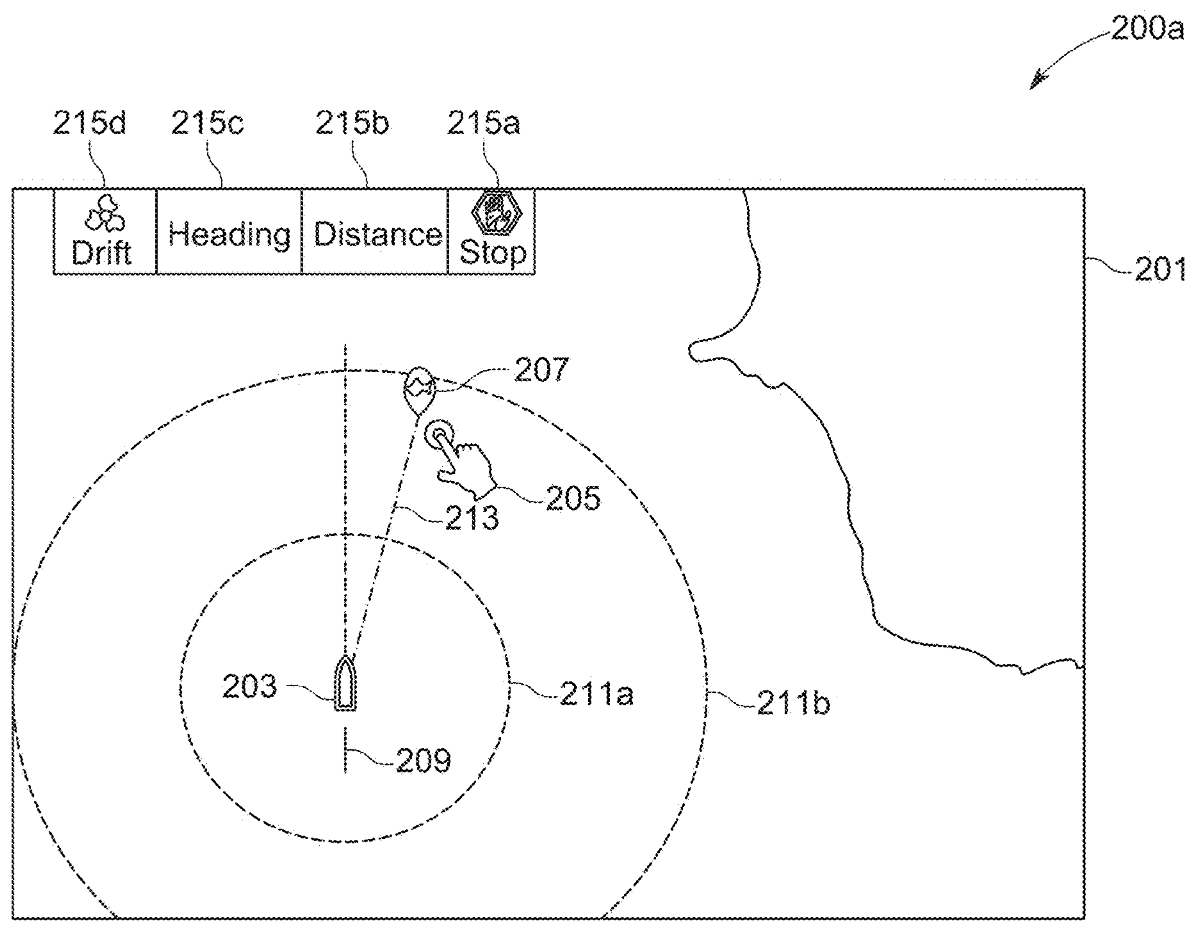
FIG. 2A illustrates a schematic diagram for receiving destination position information, in accordance with an example embodiment of the present disclosure.

FIG. 2A illustrates a schematic diagram 200*a* of a display generated by the display circuitry 101*f*, for receiving the destination position information via the input circuitry 101*a*, in accordance with an example embodiment of the present disclosure. FIG. 2A is explained in conjunction with FIG. 1A and FIG. 1B. The schematic diagram 200*a* illustrates a nautical chart 201 displayed by the display circuitry 101*f*. Initially, the display circuitry 101*f* may display, on the nautical chart 201, a watercraft position 203. For instance, the watercraft position 203 may be a position of the watercraft 103 in which the nautical drift managing device 101 is installed. Further, the display circuitry 101*f* may display, on the nautical chart 201, a graphical representation of a sea area or the waterbody 105 area and adjacent coastal regions around the watercraft position 203.

In an example embodiment, when a user 205 touches a position 207 (hereinafter, a destination position 207) on the nautical chart 201, the input circuitry 101*a* may be configured to receive position information associated with the destination position 207 as the destination position information. In an embodiment, the nautical drift managing device 101 may include a "Fish-it" function to enable the user 205 to select the destination position 207 corresponding to a fishing point. For instance, the user 205 may be a fisher man, a captain, a navigation officer, a driver, a traveler, and the like. In an example embodiment, the user 205 may be allowed to touch any one of: a pinnacle, a wreck, an artificial reef, or any place on the touch screen displaying the nautical chart 201.

In another embodiment, the input circuitry 101*a* may receive the destination position information of the destination position 207 from a sonar device or the like. For example, the sonar device may determine one or more fish schools under the waterbody 105 by transmitting waves and determine the destination position information, based on the determined one or more fish schools. The sonar device may be associated with the nautical drift managing device 101. In yet another embodiment, the input circuitry 101*a* may receive the destination position information of the destination position 207 from a database. For instance, the database may store information about one or more fish schools around the watercraft position 203 and determine the destination position information, based on the stored information of the one or more fish schools. To this end, the database may include a processing part (e.g., at least one processor) and a storage part (e.g., RAM, ROM, or the like). The database may be associated with the nautical drift managing device 101. In yet another embodiment, the input circuitry 101*a* may receive the destination position information of the destination position 207 from one or more Artificial Intelligence (AI) models. For instance, the one or more AI models may be pre-trained to calculate the destination position information of the destination position 207, based on the one or more fish schools determined by the sonar device and/or the stored information of the one or more fish schools. The one or more AI models may be executed one or more processors. The one or more processors may be associated with the nautical drift managing device 101.

Once the destination position information is received, the processing circuitry 101*c* may be configured to control the display circuitry 101*f* to display the destination position 207 on the nautical chart 201. For instance, the processing circuitry 101*c* may generate display data for displaying the destination position 207 on the nautical chart 201. Further, the processing circuitry 101*c* may be configured to control the display circuitry 101*f* to display, on the nautical chart 201, a plurality of range rings 211*a* and 211*b* around the watercraft position 203. The plurality of range rings 211*a* and 211*b* may be a plurality of concentric circles with the watercraft position 203 at the origin of the plurality of concentric circles. For example, a radius of each range ring may be configurable. Furthermore, the processing circuitry 101*c* may be configured to determine a course line 213 between the watercraft position 203 and the destination position 207; and control the display circuitry 101*f* to display the course line 213 on the nautical chart 201. Furthermore, the processing circuitry 101*c* may be configured to determine a track line 209 for the watercraft 103; and control the display circuitry 101*f* to display the track line 209 on the nautical chart 201. In an example embodiment, the track line 209 may define the heading direction of the watercraft 103.

Furthermore, the processing circuitry 101*c* may be configured to control the display circuitry 101*f* to display an information bar on the nautical chart 201. In an example embodiment, the information bar may include a plurality of operators 215*a*, 215*b*, 215*c*, and 215*d*. The plurality of operator 215*a*, 215*b*, 215*c*, and 215*d* may include a fish-it stop operator 215*a*, a distance operator 215*b*, a heading operator 215*c*, and a drift control operator 215*d*. In an example embodiment, the fish-it stop operator 215*a* may enable the user 205 to stop fish-it operation. For example, when the user 205 turns-on the fish-it stop operator 215*a*, the processing circuitry 101*c* may control the display circuitry 101*f* to stop displaying the destination position 207, the plurality of range rings 211*a* and 211*b*, the track line 209, and the course line 213.

In an example embodiment, the heading operator 215*b* may output the heading direction of the watercraft 103. In an example embodiment, the distance operator 215*c* may output a distance between the watercraft position 203 and the destination position 207. In an example embodiment, the drift control operator 215*d* may enable to the user 205 to start or stop drift-it operation. For example, the drift-it operation may include determining the drift line. For instance, when the user 205 turns-on the drift control operator 215*d*, the processing circuitry 101*c* may be configured to determine the drift line as explained in detailed description of FIG. 2B.

Figure 2B:
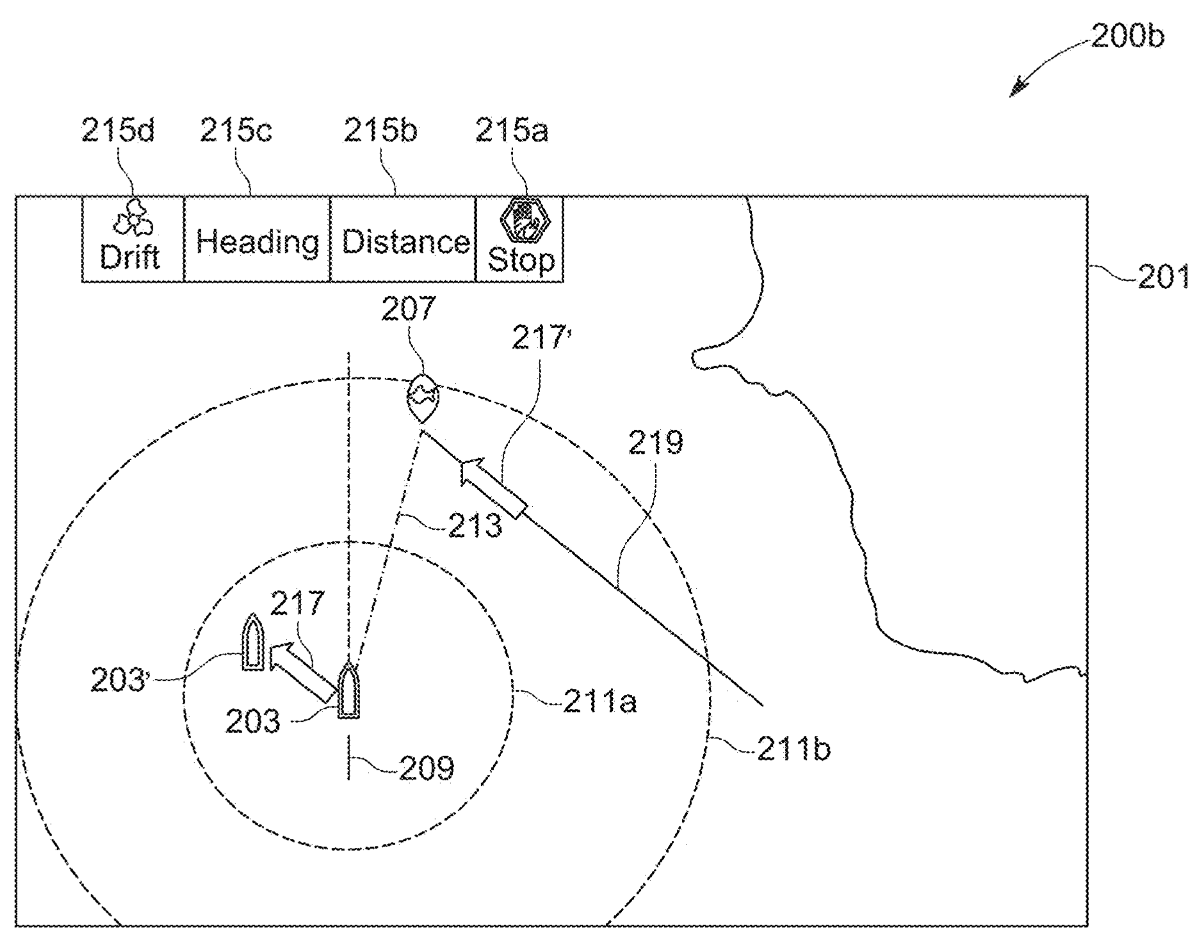
FIG. 2B illustrates a schematic diagram for determining a drift line, in accordance with an example embodiment of the present disclosure.

FIG. 2B illustrates a schematic diagram 200*b* for determining a drift line 219, in accordance with an example embodiment of the present disclosure. FIG. 2B is explained in conjunction with FIG. 2A. The schematic diagram 200*b* illustrates the nautical chart 201 displayed by the display circuitry 101*f*. For instance, the nautical chart 201 may include the watercraft position 203, the destination position 207, the track line 209, the plurality of range rings 211*a* and 211*b*, the course line 213, the plurality of operators 215*a*, 215*b*, 215*c*, and 215*d*. According to an embodiment, when the user 205 turns-on the drift control operator 215*d*, the processing circuitry 101*c* may be configured to check if an engine of the watercraft 103 is in an on-state, an off-state, or a neutral state. If the engine of the watercraft 103 is in the on-state, the processing circuitry 101*c* may be configured to provide, to the user 205, a notification to turn-off the engine of the watercraft 103 or to set the engine to the neutral state. In some embodiments, the processing circuitry 101*c* may be configured to automatically turn-off or move to neutral state, the engine of the watercraft 103 after turning-on the drift control operator 215*d* if the engine of the watercraft 103 is in the on-state. For instance, the processing circuitry 101*c* may control an engine start system associated with the watercraft 103 to turn-off or move to neutral state, the engine of the watercraft 103. As used herein, the engine start system may be a system that is configured to turn-on, (turn-off, or move to neutral state, the engine of the watercraft 103. Alternatively, when the user 205 turns-on the drift control operator 215*d*, the processing circuitry 101*c* may provide, to the user 205, a notification to move the watercraft 103 to the neutral. As used herein, the neutral may be a condition where no power is sent to motional parts of the watercraft 103 such as a propeller motor.

Some embodiments are based on the realization that even if the engine of watercraft 103 is turned-off, the watercraft 103 may be subjected to a movement 217 (hereinafter, a drift movement 217) due to the at least one external force. To this end, the sensor circuitry 101*b* may be configured to obtain the external force information associated with the watercraft 103. In an example embodiment, the nautical drift managing device 101*c* may control the sensor circuitry 101*b* to obtain the external force information. For instance, the external force information may include one or more of: the wind force information, the tidal force information, or a combination thereof. For example, the wind force information may be obtained from the anemometer and the tidal force information may be obtained from the tide gauge. In an example embodiment, the sensor circuitry 101*b* may be configured to obtain the external force information associated with the watercraft 103 from a first instance of time to a second instance of time. For instance, the first instance of time may be a time instance at which the user 205 turned-on the drift control operator 215*d*. For instance, the second instance of time may be a time instance after a predetermined time period from the first instance of time. Thereby, the second instance of time may be different from the first instance of time.

In an example embodiment, the sensor circuitry 101*b* may be further configured to obtain a first position of the watercraft 103 at the first instance of time. For instance, the first position of the watercraft 103 may be the watercraft position 203. Furthermore, the sensor circuitry 101*b* may be configured to obtain a second position 203' of the watercraft 103 at the second instance of time. For instance, the second position 203' may be a position of the watercraft 103 at the second time instance after turning-off or moving to neutral state, the engine of the watercraft 103. In an example embodiment, the second position 203' may be similar (or) different from the watercraft position 203 (e.g., the first position) depending on the at least one external force.

Once the first position (e.g., the watercraft position 203) and the second position 203' are obtained, the processing circuitry 101*c* may be configured to check if the first position is similar to the second position 203'. If the first position (e.g., the watercraft position 203) is not similar to the second position 203', the processing circuitry 101*c* may be configured to determine the drift movement 217, based on the first position and the second position 203'. In an example embodiment, the drift movement 217 may define a drift heading direction in which the watercraft 103 drifts when the at least one external force is exerted on the watercraft 103. Further, the drift movement 217 may define a drift distance travelled by the watercraft 103 from the first instance of time to the second instance of time, under influence of the at least one external force. In an example embodiment, the drift movement 217 may be associated with the external force information.

Once the drift movement 217 is determined, the processing circuitry 101*c* may be configured to determine the drift line 219, based on the destination position information and the external force information. In an example embodiment, the processing circuitry 101*c* may determine the drift line 219 at the destination position 207 defined by the destination position information such that the drift line 219 is parallel to the drift movement 217 associated with the external force information. In other words, the processing circuitry 101*c* may determine the drift line 219 based on the destination position information and the external force information such that the drift line 219 is associated with a drift movement 217'. In an example embodiment, the drift movement 217' may be similar (or identical) to the drift movement 217 and may be located parallel to the drift movement 217 at the destination position 207. In an example embodiment, the processing circuitry 101*c* may determine the drift line 219 associated with the drift movement 217' when the engine of the watercraft 103 is turned-off (stopped or neutral). In an example embodiment, a length of the drift line 219 may be a predetermined length. In an example embodiment, the processing circuitry 101*c* may be further configured to control the display circuitry 101*f* to display the drift line 219 on the nautical chart 201. For instance, the processing circuitry 101*c* may generate display data for displaying the drift line 219 on the nautical chart 201.

In this way, the processing circuitry 101*c* may determine the drift line 219, based on the destination position information and the external force information. As a result of determining the drift line 219, the processing circuitry 101*c* may avoid the burden, on the user 205, to predict the drift patterns of the watercraft 103 in challenging environmental conditions. Further, the prediction made by the user 205 on the drift patterns may not be realistic, due to which fishing time and fuel consumed by the watercraft 103 may increase. Accordingly, the processing circuitry 101*c* may reduce the fishing time and the fuel consumed by the watercraft 103, by determining the drift line 219. Thereby, the processing circuitry 101*c* may enable the user 205 to catch fishes in an efficient manner.

Further, the processing circuitry 101*c* may utilize the determined drift line 219 to assist the user 205 in fishing applications. To this end, the processing circuitry 101*c* may be further configured to determine a drift start position on the drift line 219. For instance, the processing circuitry 101*c* may determine the drift start position, as explained in the detailed description of FIG. 2C.

Figure 2C:
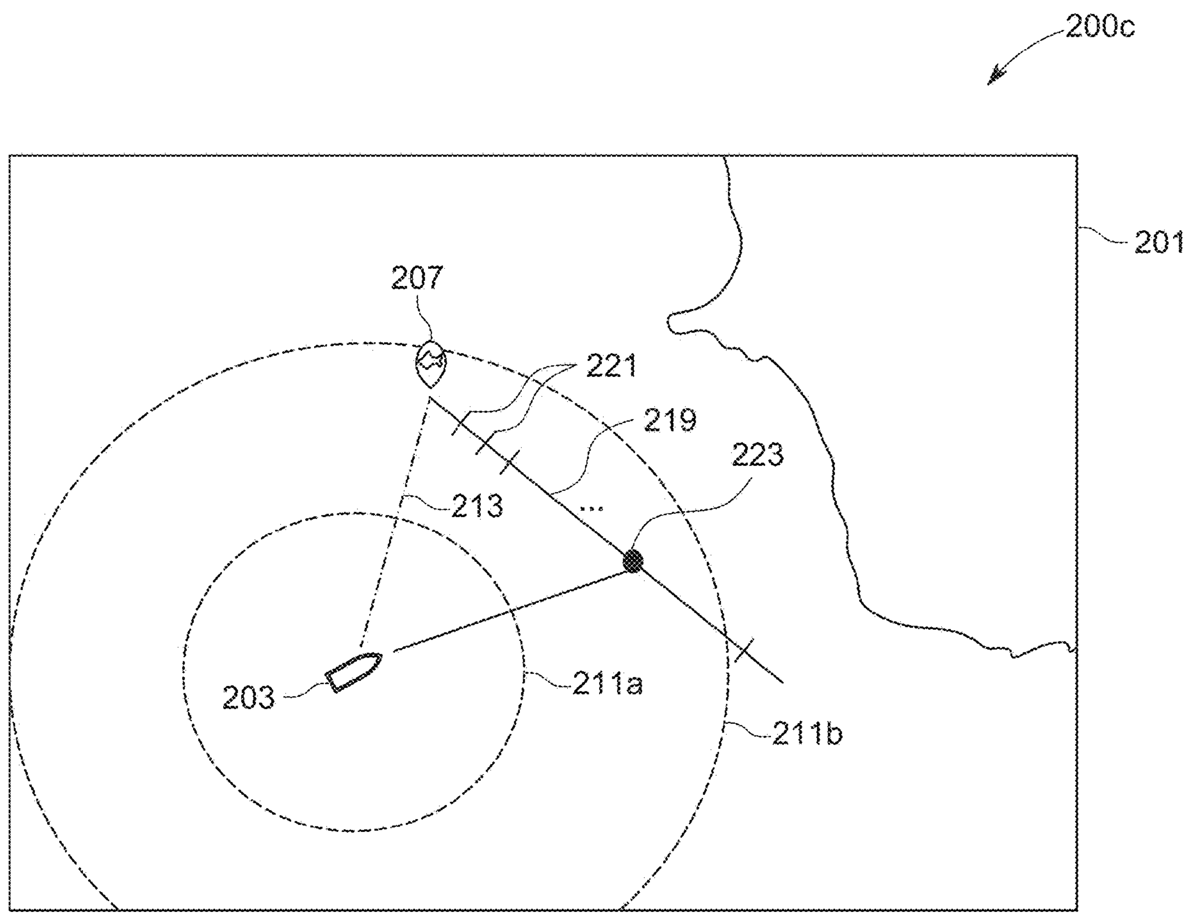
FIG. 2C illustrates a schematic diagram for determining a drift start position on the drift line, in accordance with an example embodiment of the present disclosure.

FIG. 2C illustrates a schematic diagram 200*c* for determining a drift start position 223 on the drift line 219, in accordance with an example embodiment of the present disclosure. FIG. 2C is explained in conjunction with FIG. 2B. The schematic diagram 200*c* illustrates the nautical chart 201 displayed by the display circuitry 101*f*. For instance, the nautical chart 201 may include the watercraft position 203, the destination position 207, the plurality of range rings 211*a* and 211*b*, the course line 213, and the drift line 219. Here for purpose of explanation, the watercraft position 203 is considered, however the watercraft position 203 may be replaced with the second position 203'.

According to an embodiment, after determining the drift line 219, the processing circuitry 101*c* may be configured to determine a drift start position 223 on the drift line 219, based on the external force information, the destination position information and drift time information. In an example embodiment, to determine the drift start position 223, the processing circuitry 101*c* may be configured to determine a drift time scale 221 associated with the drift line 219. In an example embodiment, the processing circuitry 101*c* may determine the drift time scale 221 associated with the drift line 219, based on one or more of the external force information and/or the drift movement 217. In an example embodiment, the processing circuitry 101*c* may determine the drift time scale 221 such that the drift time scale 221 may divide the drift line 219 into a plurality of sub-drift lines. For example, each sub-drift line may define a drift distance that the watercraft 103 can cover in a predefined time period. For instance, the drift distance defined by each of the plurality of sub-drift lines may be identical (or similar).

Once the drift time scale 221 is determined, the processing circuitry 101*c* may be configured to control the input circuitry 101*a* to receive the drift time information. In an example embodiment, the drift time information may indicate time information to reach the destination position 207 while drifting along the drift line 219 under influence of the at least one external force. For instance, the time information may be at least one of three minutes, five minutes, ten minutes, fifteen minutes, twenty minutes, or any other configurable value. Accordingly, the input circuitry 101*a* may be configured to receive from the user 205, the drift time information to reach the destination position 207 on the drift line 219. For instance, the user 205 may touch the drift line 219; and set the drift time information.

Once the drift time information is received, the processing circuitry 101*c* may be configured to determine the drift start position 223 on the drift line 219 by using the destination position information, the drift time information, and the drift time scale 221. For instance, for determining the drift start position 223, the processing circuitry 101*c* may perform, by using the drift time scale 221 and the drift time information, a search operation starting from the destination position information on the drift line 219.

Once the drift start position 223 is determined, the processing circuitry 101*c* may be configured to control the display circuitry 101*f* to display, on the nautical chart 201, the drift start position 223 on the drift line 219. For instance, the processing circuitry 101*c* may generate display data for displaying the drift start position 223 on the drift line 219. Further, the processing circuitry 101*c* may be configured to provide, to the user 205, a notification to turn-on the engine of the watercraft 103. In another embodiment, the processing circuitry 101*c* may be configured to automatically turn-on the engine of the watercraft 103. For instance, the processing circuitry 101*c* may be configured to control the engine start system to turn-on the engine of the watercraft 103. Furthermore, the processing circuitry 101*c* may control a rudder of the watercraft 103 to reach at least one of the drift start position 223 and the drift line 219. In preferred embodiment, the processing circuitry 101*c* may control the rudder of the watercraft 103 to reach the drift start position 223 located on the drift line 219. Thereby, the watercraft 103 may automatically reach the drift start position 223 such that a burden on the user 205 to control the rudder of the watercraft 103 to reach the drift start position 223 is avoided.

Furthermore, the processing circuitry 101*c* may be configured to turn-off (or stop) the engine of the watercraft 103, when a location of the watercraft 103 indicates at least one of the drift start position 223, a position on the drift line 219, or a combination thereof. For instance, the processing circuitry 101*c* may be configured to control the engine start system to turn-off the engine of the watercraft 103. For instance, the location of the watercraft 103 may be a position identified by the position detection circuitry 101*g*. In preferred embodiment, the processing circuitry 101*c* may be configured to turn-off the engine of the watercraft 103, when the location of the watercraft 103 indicates the drift start position 223. After turning-off the engine of the watercraft 103 at the drift start position 223, the watercraft 103 may start drifting on the waterbody 105 along the drift line 219 under the influence of the at least one force. For instance, the watercraft 103 may drift along the drift line 219 as illustrated in FIG. 2D.

Figure 2D:
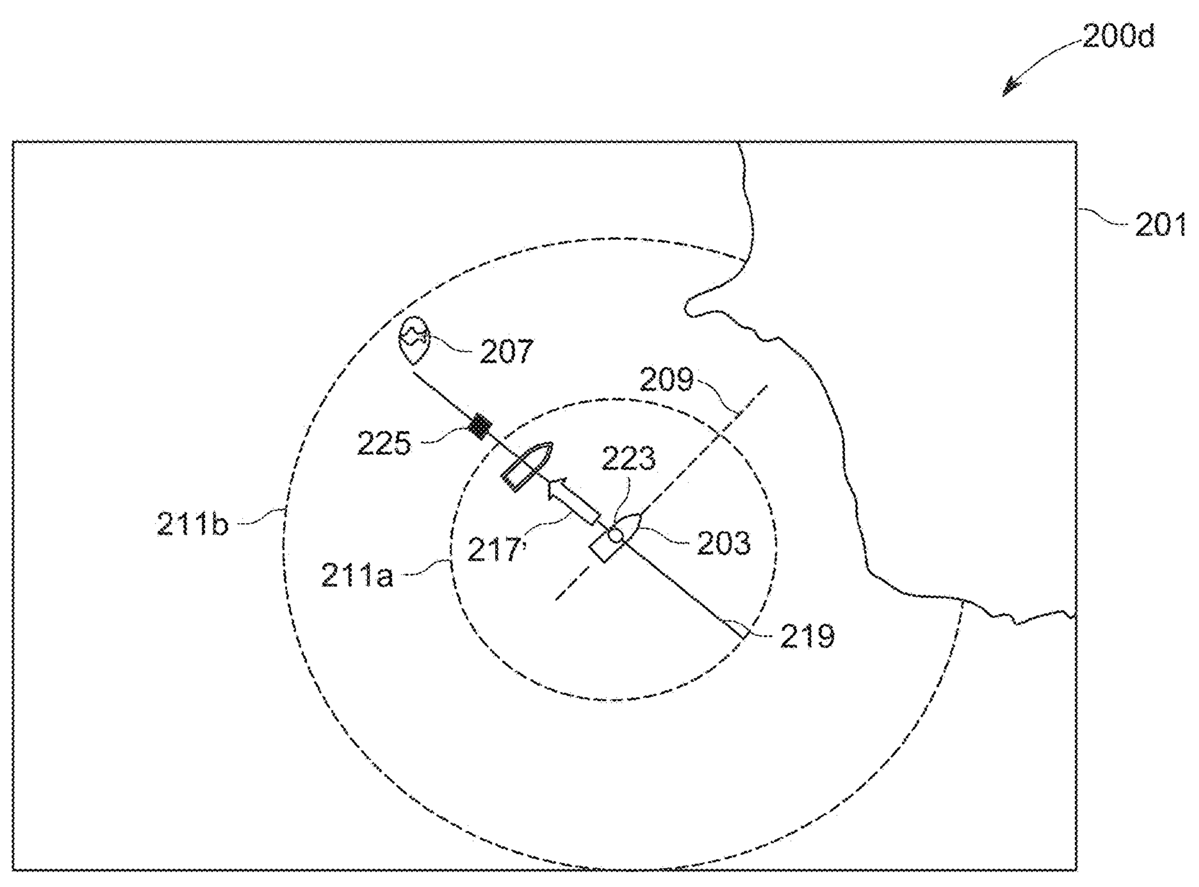
FIG. 2D illustrates a schematic diagram showing drifting of a watercraft, in accordance with an example embodiment of the present disclosure.

FIG. 2D illustrates a schematic diagram 200*d* showing drifting of the watercraft 103, in accordance with an example embodiment of the present disclosure. FIG. 2D is explained in conjunction with FIG. 2C. The schematic diagram 200*d* illustrates the nautical chart 201 displayed by the display circuitry 101*f*. For instance, the nautical chart 201 may include the watercraft position 203, the destination position 207, the track line 209, the plurality of rang rings 211*a* and 211*b*, the drift movement 217', the drift line 219, and the drift start position 223. For instance, in FIG. 2D, the watercraft position 203 may be a position of the watercraft 103 after reaching the drift start position 223.

Once the watercraft 103 reaches the drift start position 223 and the engine of the watercraft 103 is turned-off or is set to the neutral state, the watercraft 103 may drift along the drift line 219 in a drift direction defined by the drift movement 217'. For instance, the drift direction defined by the drift movement 217' may be similar to the drift direction of the drift movement 217. Hereinafter, the drift direction defined by the drift movement 217' and a direction of the drift line 219 may be interchangeably used to mean the same. In an example embodiment, the direction of the drift line 219 may be different from the heading direction of the watercraft 103. For instance, in FIG. 2D, the direction of the drift line 219 may be perpendicular to the heading direction of the watercraft 103. In an example embodiment, the heading direction of the watercraft 103 may be identified by the heading sensor 101*h*. For instance, the heading direction of the watercraft 103 may be represented by the track line 209.

Some embodiments are based on realization that the watercraft 103 may not stop at the destination position 207 while drifting along the drift line 219, since the movement of the watercraft 103 is due to the at least one external force. To this end, the processing circuitry 101*c* may be configured to determine an anchor drop position 225 on the drift line 219. In an example embodiment, the anchor drop position 225 may be a position at which an anchor associated with the watercraft 103 should be dropped to stop the watercraft 103 at the destination position 207. For instance, the processing circuitry 101*c* may determine the anchor drop position 225 on the drift line 219, as explained in the detailed description of FIG. 2E.

Figure 2E:
FIG. 2E illustrates a schematic diagram for determining an anchor drop position, in accordance with an example embodiment of the present disclosure.
Figure 2E:
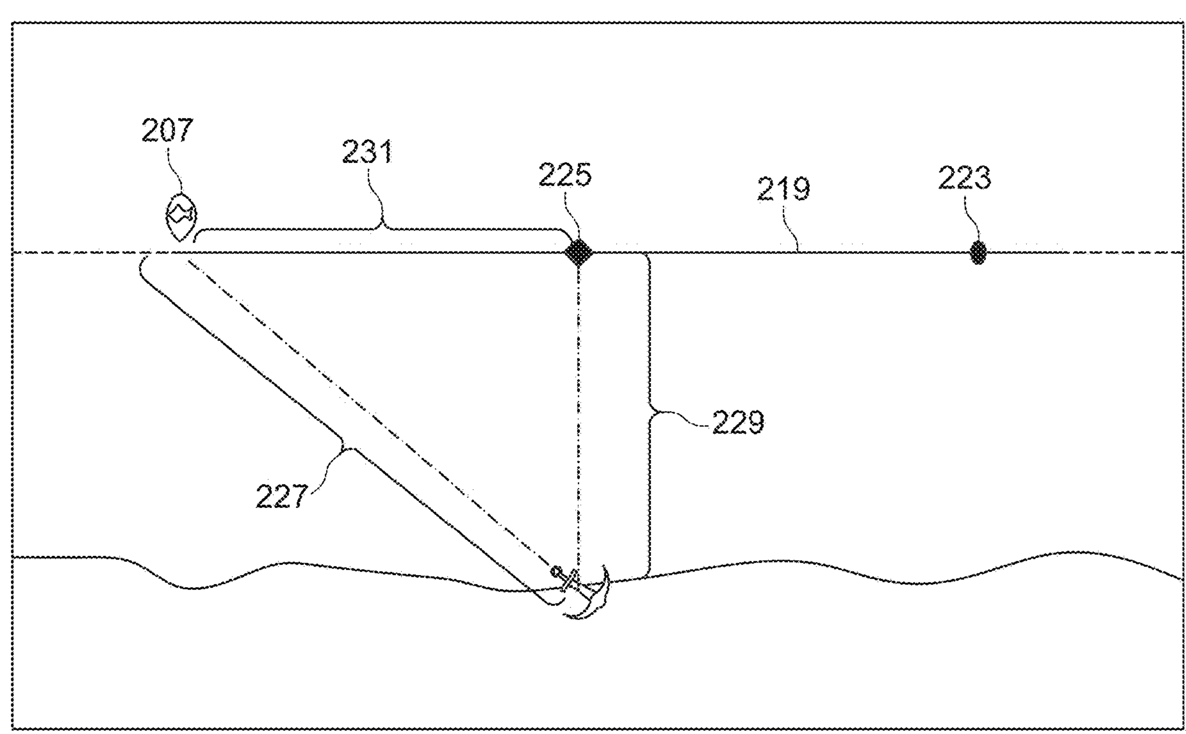

FIG. 2E illustrates a schematic diagram 200*e* for determining an anchor drop position 225, in accordance with an example embodiment of the present disclosure. FIG. 2E is explained in conjunction with FIG. 2D. The schematic diagram 200*e* illustrates a cross-sectional view of the waterbody 105. As illustrated in FIG. 2E, the schematic diagram 200*e* may include the destination position 207, the drift line 219, the drift start position 223, the anchor drop position 225, a length 227 of an anchor chain, a depth 229 of the waterbody 105.

According to an embodiment, to determine the anchor drop position 225, the processing circuitry 101*c* may be configured to control the input circuitry 101*a* to receive length information associated with the length 227 of the anchor chain. Accordingly, the input circuitry 101*a* may receive the length information (e.g., a length value) of the length 227 of the anchor chain. In an example embodiment, the input circuitry 101*a* may receive the length information from the user 205.

Further, the processing circuitry 101*c* may be configured to control the sensor circuitry 101*b* to determine depth information associated with the depth 229 of the waterbody 105, while the watercraft 103 is drifting along the drift line 219. Accordingly, the sensor circuitry 101*b* may be configured to determine the depth information associated with the depth 229 along the drift line 219. In an example embodiment, the sensor circuitry 101*b* may further include one or more depth sensors to determine the depth information associated with the depth 229. In another embodiment, the processing circuitry 101*c* may be configured to obtain, from the memory 101*d*, the depth information associated with the depth 229 along the drift line 219, if the memory 101*d* stores the chart information associated with the nautical chart 201.

Furthermore, the processing circuitry 101*c* may be configured to determine the anchor drop position 225, based on the destination position information, the drift line 219, the length information associated with the length 227, and the depth information associated with the depth 229. For instance, the processing circuitry 101*c* may determine, using Pythagorean theorem, an anchor drop distance 231, based on the length information associated with the length 227 and the depth information associated with the depth 229; and perform, using the anchor drop distance 231, the search operation on the drift line 219 starting from the destination position information to determine the anchor drop position 225 on the drift line 219.

Referring back to FIG. 2D, once the anchor drop position 225 is determined, the processing circuitry 101*c* may be configured to control the display circuitry 101*f* to display, on the nautical chart 201, the anchor drop position 225 on the drift line 219. For instance, the processing circuitry 101*c* may generate display data for displaying the anchor drop position 225 and may control the display circuitry 101*f* to display the generated display data. In an example embodiment, the sensor circuitry 101*b* may be continuously track the position (or the location) of the watercraft 103, while the watercraft 103 is drifting along the drift line 219. For instance, the position detection circuitry 101*g* may continuously identify the position of the watercraft 103. In an example embodiment, the processing circuitry 101*c* may check if the position (or the location) of the watercraft 103 indicates reaching of the anchor drop position 225. If the position of the watercraft 103 indicates reaching of the anchor drop position 225, the processing circuitry 101*c* may be configured to provide, for the user 205, a notification to drop the anchor in the waterbody 105.

Further, when the position (or the location) of the watercraft 103 indicates reaching of the destination position 207 defined by the destination position information, the processing circuitry 101*c* may be configured to activate an auto-heading control mode. In other words, when the position of the watercraft 103 corresponds to the destination position, the processing circuitry 101*c* may turn-on the auto-heading control mode. In an example embodiment, when the auto-heading control mode is activated, a heading control system may be triggered to execute the auto-heading control mode. For instance, the heading control system may include at least one processor to execute the auto-heading control mode. In an example embodiment, when the heading control system executes the auto-heading control mode, the heading direction of the watercraft 103 may be maintained at a preset heading direction. For instance, when the heading control system executes the auto-heading control mode, the heading control system may control the rudder of the watercraft 103 to maintain the heading direction of the watercraft at the preset heading direction. In an example embodiment, the heading control system may be associated with the nautical drift managing device 101. In another example embodiment, the heading control system may be a part of the nautical drift managing device 101. Thereby, the processing circuitry 101*c* may reduce a burden on the user 205 to control the rudder to maintain a particular heading direction while fishing. Additionally, when the position (or the location) of the watercraft 103 indicates reaching of the destination position 207 defined by the destination position information, the processing circuitry 101*c* may be configured to provide, for the user 205, a notification to start fishing.

In this way, the processing circuitry 101*c* may assist the user 205 in the fishing application, by utilizing the drift line 219. Here for purpose of explanation, the processing circuitry 101*c* assisting the user 205 in the fishing application is considered. However, the processing circuitry 101*c* may assist the user 205 in stopping the watercraft 103 at a specific position for avoiding navigation hazards. For instance, when a bridge to allow the watercraft 103 to navigate is not opened, the processing circuitry 101*c* may assist the user 205 in stopping the watercraft 103 at a specific position for opening of the bridge.

Further, in an example embodiment, the nautical drift managing device 101 may allow the user 205 to set a new destination position after reaching the destination position 207 (or after fishing at the destination position 207). Furthermore, the nautical drift managing device 101 may be configured to determine a new drift line and a new drift start position for the new destination position. For instance, the nautical drift managing device 101 may determine the new drift line and the new drift start position as explained in the detailed description of FIG. 3A.

Figure 3A:
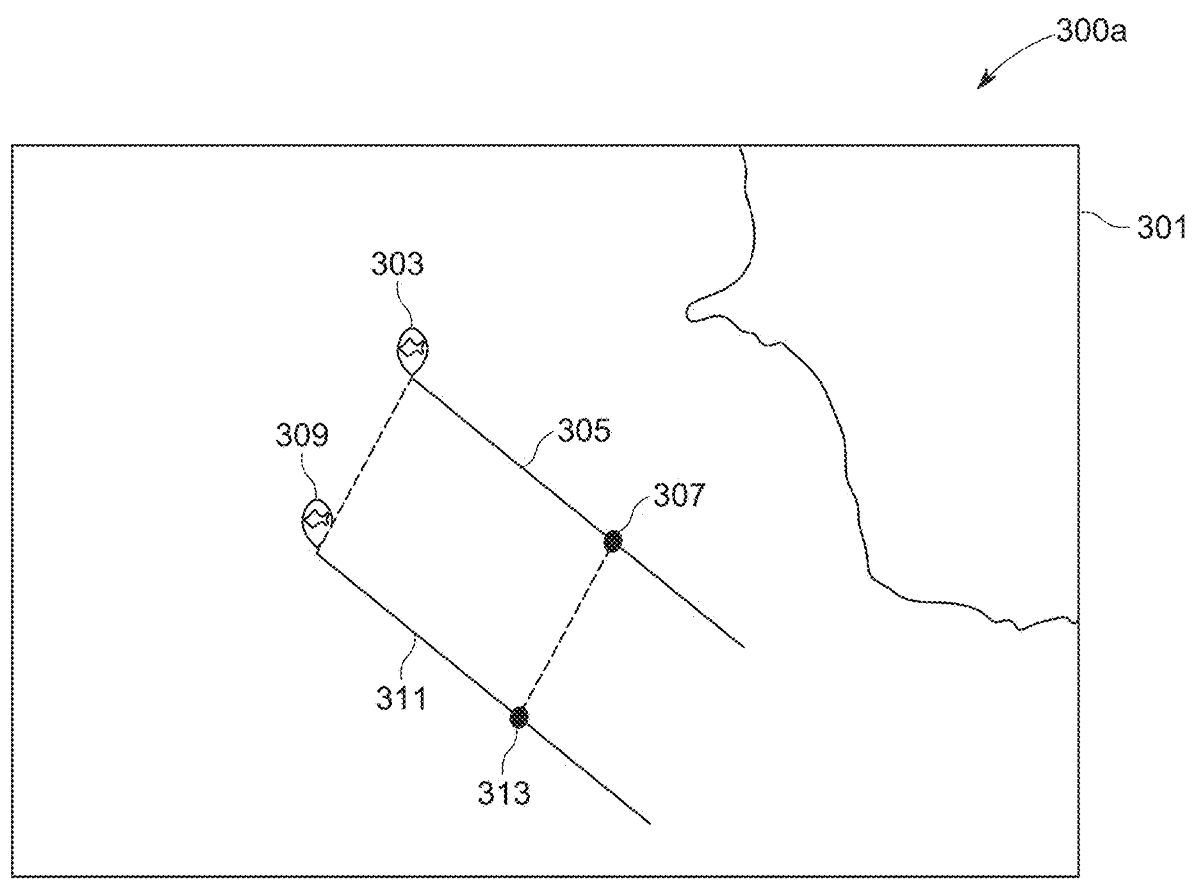
FIG. 3A illustrates a schematic diagram for determining a new drift line and a new drift start position, in accordance with an example embodiment of the present disclosure.

FIG. 3A illustrates a schematic diagram 300*a* for determining a new drift line 311 and a new drift start position 313, in accordance with an example embodiment of the present disclosure. FIG. 3A is explained in conjunction with FIG. 1A-FIG. 2E. The schematic diagram 300*a* illustrates a nautical chart 301 displayed by the display circuitry 101*f* The nautical chart 301 may correspond to the nautical chart 201. Initially, the nautical chart 301 may include a destination position 303, a drift line 305, and a drift start position 307. For instance, the destination position 303 may correspond to the destination position 207, the drift line 305 may correspond to the drift line 219, and the drift start position 307 may correspond to the drift start position 223.

In an example embodiment, when the user (e.g., the user 205) touches a position 309 (hereinafter, a new destination position 309) on the nautical chart 301, the input circuitry 101*a* may be configured to receive the position information associated with the new destination position 309 as new destination position information. Once the new destination position information is received, the processing circuitry 101*c* may control the display circuitry 101*f* to display the new destination position 309. In an example embodiment, the memory 101*d* may store a past voyage associated with the watercraft 103. For instance, the memory 101*d* may store the destination position 303, the drift line 305 associated with the destination position 305, and the drift start position 307 associated with the destination position 303 as the past voyage.

Some embodiments are based on the realization that the at least force exerted on the watercraft 103 at a first position and the at least force exerted on the watercraft 103 at a second position may be similar, if the first position and the second position are within a particular geographic region. To this end, the processing circuitry 101*c* may be configured to check if the new destination position 309 defined by the new destination position information is located within a geographic region in which the destination position 303 is located. In other words, the processing circuitry 101*c* may check if a distance between the new destination position 309 and the destination position 303 is less than a threshold distance.

If the new destination position 309 is located within the geographic region in which the destination position 303 is located, the processing circuitry 101*c* may be configured to determine, based on the new destination position information and the drift line 305, a new drift line 311 regardless of the external force information. In an example embodiment, the processing circuitry 101*c* may determine the new drift line 311 at the new destination position 309 such that the new drift line 311 is parallel to the drift line 305. For instance, while determining the new drift line 311, the processing circuitry 101*c* may not use the external force information because of availability of past voyage information. Thereby, the processing circuitry 101*c* reduces computation time and processing instructions of the nautical drift managing device 101, by determining the new drift line 311 based on the new destination position information and the drift line 305. Accordingly, the processing circuitry 101*c* improves efficiency of the nautical drift managing device 101.

Conversely, if the new destination position 309 is not located within the geographic region in which the destination position 303 is located, the processing circuitry 101*c* may be configured to determine the new drift line 311, based on the external force information and the received new destination position information. For instance, the processing circuitry 101*c* may determine the new drift line 311 similarly as explained with respect to the drift line 305 (e.g., the drift line 219), if the new destination position 309 is not located within the geographic region in which the destination position 303 is located. In some embodiments, the processing circuitry 101*c* may allow the user to select whether to determine the new drift line 311 using the external force information or without using the external force information. For instance, the processing circuitry 101*c* may control the display circuitry 101*f* to display, on the nautical chart 301, an additional control operator to allow the user to select whether to determine the new drift line 311 using the external force information or without using the external force information. According to a user input on the additional control operator, the processing circuitry 101*c* may be configured to determine the new drift line 311 with or without using the external force information.

Once the determine the new drift line 311 is determined, the processing circuitry 101*c* may be configured to control the display circuitry 101*f* to display the new drift line 311 on the nautical chart 301. Further, the processing circuitry 101*c* may be configured to display a new drift start position 313 on the new drift line 311, based on the new destination position information, the destination position information, the drift start position 307, and the new drift line 311. In an example embodiment, the processing circuitry 101*c* may determine, using a law of parallelogram, the new drift start position 313 on the new drift line 311. For instance, the processing circuitry 101*c* may determine the new drift start position 313 on the drift line 311 such that a summation of a first distance and a second distance is numerically equal to a summation of a third distance, and a fourth distance, where the first distance is a square of a distance between the destination position 303 and the new drift start position 313; the second distance is a square of a distance between the drift start position 307 and the new destination position 309; the third distance is a square of a distance between the destination position 303 and the drift start position 307; and the fourth distance is a square of a distance between the destination position 303 and the new destination position 309.

Once the new drift start position 313 is determined, the processing circuitry 101*c* may be configured to control the display circuitry 101*f* to display, on the nautical chart 301, the new drift start position 313 on the drift line 311. Further, the processing circuitry 101*c* may control the rudder to reach the new drift start position 313. Once the location of the watercraft 103 corresponds to the new drift start position 313, the processing circuitry 101*c* may be configured to turn-off the engine of the watercraft 103 by controlling the engine start system. Once the engine of the watercraft 103 is turned-off, the watercraft 103 may drift along the new drift line 311 to reach the new destination position 309. In an example embodiment, while the watercraft 103 is drifting along the new drift line 311, the processing circuitry 101*c* may determine the anchor drop position on the new drift line 311. For instance, the processing circuitry 101*c* may determine the anchor drop position on the new drift line 311, based on the length information associated the length of the anchor chain, the depth information associated with the depth along the new drift line 311, and the new destination position information.

In this way, the processing circuitry 101*c* may determine the new drift line 311 and the new drift start position 313 for the received new destination position information. Some embodiments are based on the recognition that the watercraft 103 may not accurately reach the destination position 303, due to variations in the at least one external force. Thereby, a position error may exist between the destination position 303 and the position of the watercraft 103 once the watercraft 103 has reached the destination position 303. To this end, the processing circuitry 101*c* may be configured to determine the position error and offset the position error while determining the new drift line 311. For instance, the processing circuitry 101*c* may determine the position error and offset the position error while determining the new drift line 311, as explained in the detailed description of FIG. 3B and FIG. 3C.

Figure 3B:
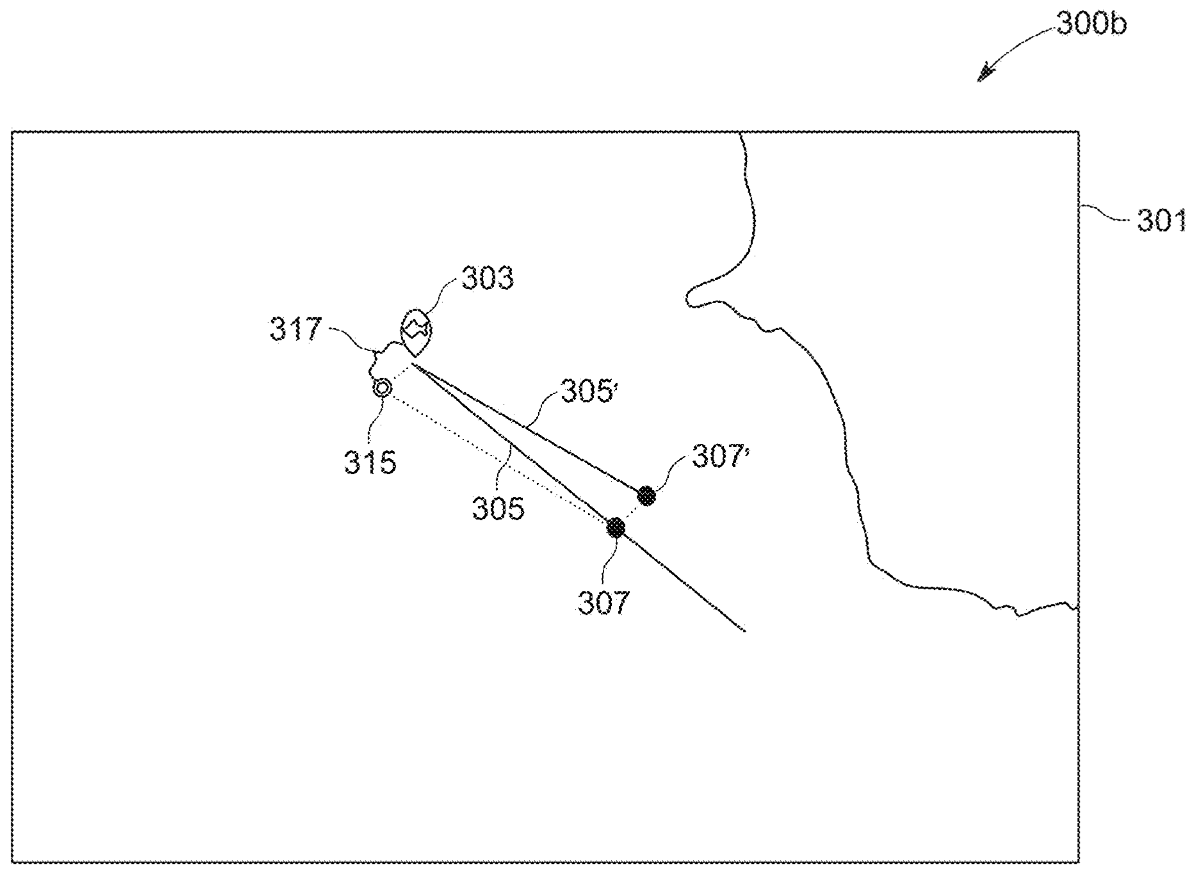
FIG. 3B illustrates a schematic diagram for determining a position error, in accordance with an example embodiment of the present disclosure.

FIG. 3B illustrates a schematic diagram 300*b* for determining the position error, in accordance with an example embodiment of the present disclosure. FIG. 3B is explained in conjunction with the FIG. 3A. The schematic diagram 300*b* illustrates the nautical chart 301 displayed by the display circuitry 101*f*. In an example embodiment, the processing circuitry 101*c* may check if the watercraft 103 has stopped drifting. For instance, the processing circuitry 101*c* may check if a position 315 of the watercraft 103 is not varying for a certain time period. If the position 315 of the watercraft 103 is not varying for the certain time period, the processing circuitry 101 may check if the position error exists between the destination position 303 and the position 315 of the watercraft 103. In order to check if the position error exists between the destination position 303 and the position 315, the processing circuitry 101*c* may determine position error information 317 between the destination position information (i.e., the destination position 303) and the position 315 of the watercraft 103. Further, the processing circuitry 101*c* may check if the position error information 317 is greater than a predefined error information.

If the position error information 317 is greater than the predefined error information, the nautical drift managing device 101*c* may be configured to offset, based on the position error information 317, the drift line 305, the drift start position 307, and the new destination position information, the position error while determining the new drift line 311 and the new drift start position 313. In other words, the processing circuitry 101*c* may determine a modified drift line that replaces the new drift line 311, based on the position error information 317, the drift line 305, and the new destination position information. Further, the processing circuitry 101*c* may determine a modified drift start position that replaces the new drift start position 313 on the drift line 311, based on the position error information 317, the drift line 305, the drift start position 307, and the new destination position information.

In order to determine the modified drift line that replaces the new drift line 311 based on the position error information 317, the drift line 305, and the new destination position information, the processing circuitry 101*c* may be configured to determine a corrected drift line 305', based on the position error information 317 and the drift line 305. For instance, to determine the corrected drift line 305', the processing circuitry 101*c* may tilt the drift line 305 by a distance defined by the position error information 317 while placing an end of the drift line 305 that correspond to the destination position 317 at a constant position. In other words, the processing circuitry 101*c* may determine the corrected drift line 305' such that the corrected drift line 305' is parallel to a line between the position 315 and the drift start position 307.

In order to determine the modified drift start position that replaces the new drift start position 313 on the drift line 311, based on the position error information 317, the drift line 305, the drift start position 307, and the new destination position information, the processing circuitry 101*c* may be configured to determine a corrected drift start position 307', based on the position error information 317, the drift line 305, and the drift start position 307. For instance, the processing circuitry 101*c* may be configured to determine, using the law of parallelogram, the corrected drift start position 307', based on the position error information 317, the drift line 305, and the drift start position 307.

Figure 3C:
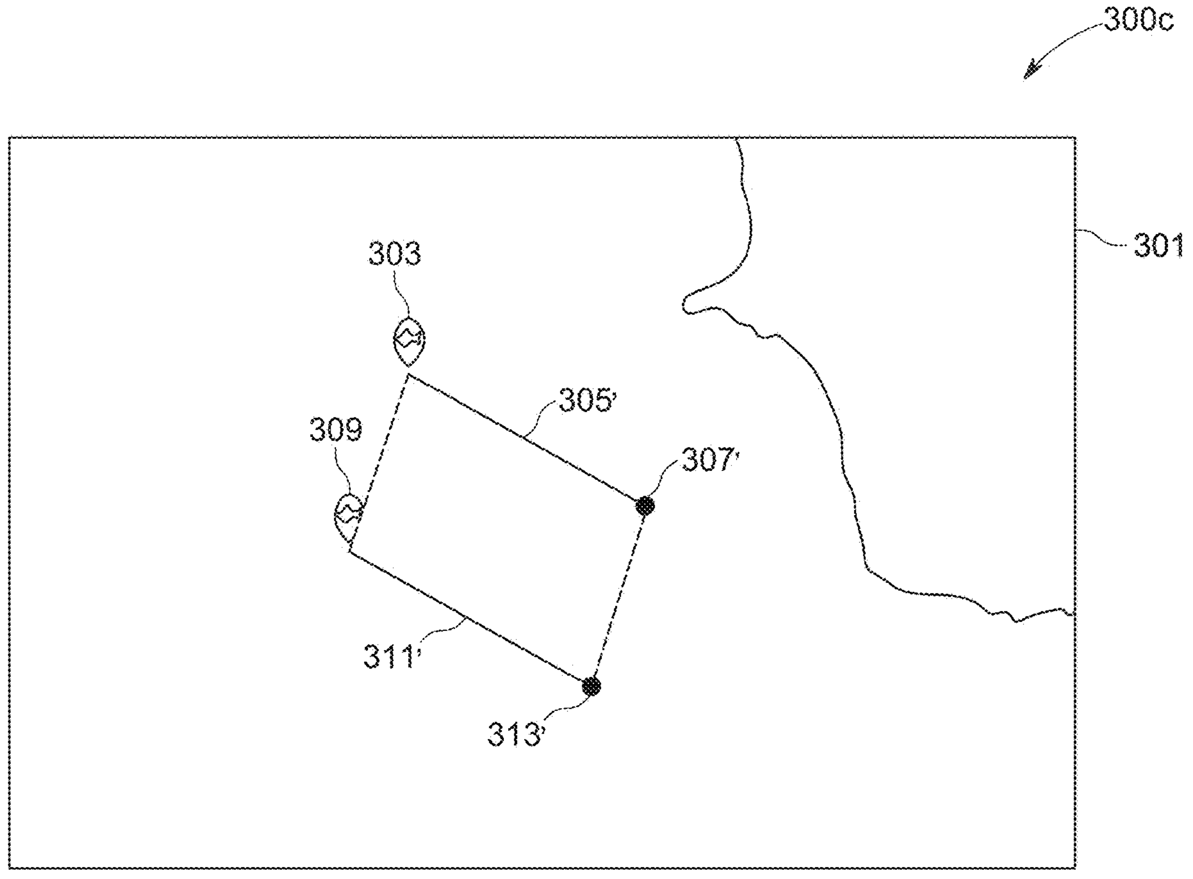
FIG. 3C illustrates a schematic diagram for determining a modified drift line and a modified drift start position, in accordance with another example embodiment of the present disclosure.

Once the corrected drift line 305' and the corrected drift start position 307' is determined, the processing circuitry 101*c* may be configured to determine the modified drift line that replaces the new drift line 311 and the modified drift start position that replaces the new drift start position 313, as explained in the detailed description of FIG. 3C.

FIG. 3C illustrates a schematic diagram 300*c* for determining the modified drift line 311' and the modified drift start position 313', in accordance with another example embodiment of the present disclosure. FIG. 3C is explained in conjunction with FIG. 3B. The schematic diagram 300*c* illustrates the nautical chart 301 displayed by the display circuitry 101*f*. In an example embodiment, the processing circuitry 101*c* may be configured to determine the modified drift line 311', based on the corrected drift line 305' and the new destination information. For instance, the processing circuitry 101*c* may determine the modified drift line 311' at the new destination position information such that the modified drift line 311' is parallel to the corrected drift line 305'. In an example embodiment, the processing circuitry 101*c* may be configured to determine the modified drift start position 313' on the modified drift line 311', based on the corrected drift line 305', the corrected drift start position 307', and the new destination information. For instance, the processing circuitry 101*c* may determine, using the law of parallelogram, the modified drift start position 313' on the modified drift line 311', based on the corrected drift line 305', the corrected drift start position 307', and the new destination information.

In this way, the processing circuitry 101*c* may be configured to determine the position error and offset the position error while determining the new drift line 311 and the new drift start position 313. To this end, the processing circuitry 101*c* may determine the modified drift line 311' replace the new drift line 311 and the modified drift start position 313' that replaces the drift start position 313. Thereby, the processing circuitry 101*c* ensures that the watercraft 103 accurately reaches the new destination position 309 by determining the modified drift line 311' and the modified drift start position 313' based on the position error information 317.

Figure 4:
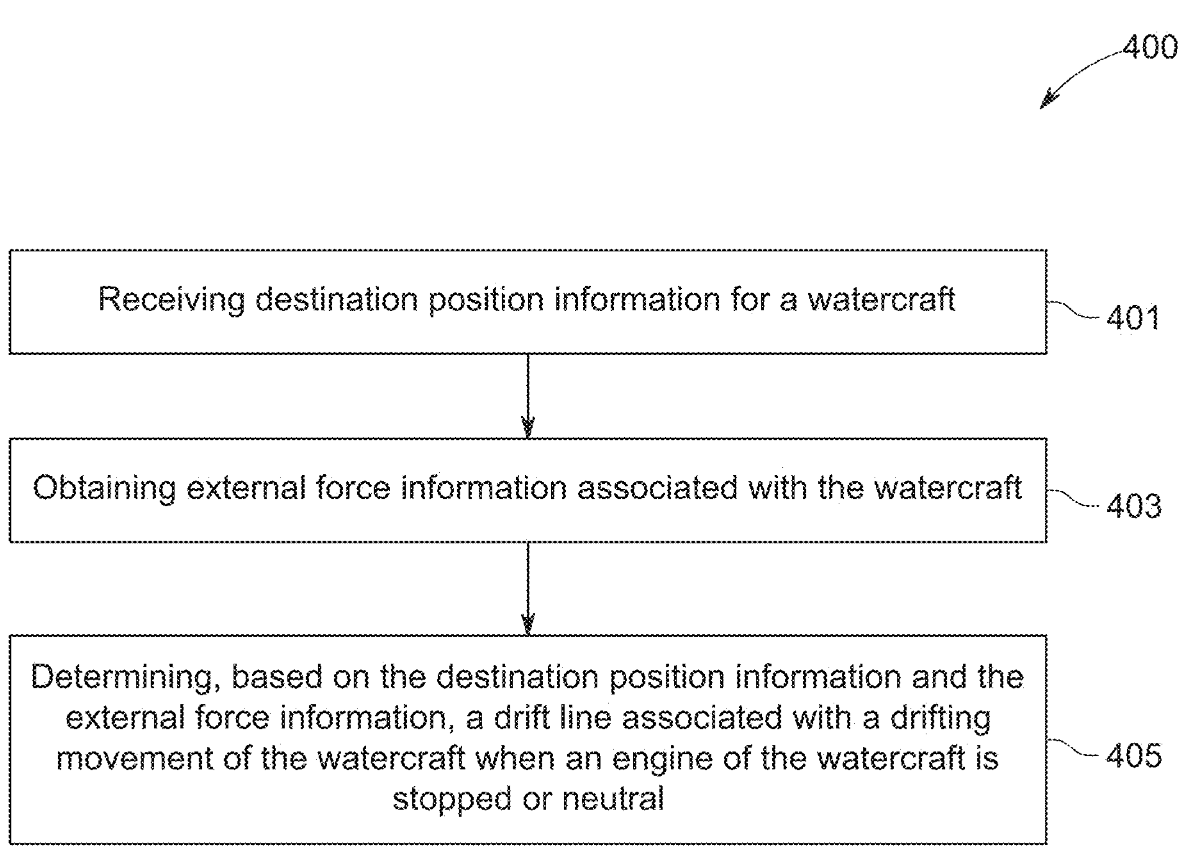
FIG. 4 illustrates a nautical drift managing method for determining the drift line, in accordance with an example embodiment of the present disclosure.

FIG. 4 illustrates a nautical drift managing method 400 for determining the drift line, in accordance with an example embodiment of the present disclosure. The nautical drift managing method 400 may be used in conjunction with the nautical drift managing device 101 described in the detailed description of FIG. 1A and FIG. 1B. Starting at step 401, the nautical drift managing method 400 may include receiving the destination position information for the watercraft 103. For instance, the input circuitry 101*a* may receive the destination position information for the watercraft 103.

At step 403, the nautical drift managing method 400 may include obtaining the external force information associated with the watercraft 103. For instance, the sensor circuitry 101*b* may be configured to obtain the external force information associated with the watercraft 103 as explained in the detailed description of FIG. 2B.

At step 405, the nautical drift managing method 400 may include determining, based on the external force information and the destination position information, the drift line 219 associated with the drift movement 217' of the watercraft 103, when the engine of the watercraft 103 is stopped or is in a neutral state. For instance, the processing circuitry 101*c* may determine the drift line 219 associated with the drift movement 217' of the watercraft 103, when the engine of the watercraft 103 is stopped or is in the neutral state, as explained in the detailed description of FIG. 2B.

On implementing the nautical drift managing method 400, the nautical drift managing device 101 may be configured to determine the drift line 219, based on the destination position information and the external force information such that the burden, on the user 205, to predict the drift patterns of the watercraft 103 in challenging environmental conditions is avoided. Further, the nautical drift managing device 101 may enable the user 205 to catch fishes in an efficient manner, without creating noise and also saving fuel, due to the determination of the accurate drift start position for the drifting motion of the watercraft 103.

Many modifications and other embodiments of the present disclosure set forth herein will come to mind of one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiment disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached FIGURES should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A nautical navigation device, comprising:
processing circuitry configured to:
receive a destination position for a watercraft;
receive external force information in relation to the watercraft; and
determine, based on the destination position and the external force information, a drift line in relation to a movement of the watercraft to reach the destination position from a specific position in case an engine of the watercraft is stopped or in neutral.

2. The nautical navigation device of claim 1, wherein the processing circuitry is further configured to:
receive drift time information to reach the destination position on the drift line; and
determine a drift start position on the drift line, based on the destination position, the external force information, and the drift time information, wherein the specific position corresponds to the drift start position of the watercraft on the drift line.

3. The nautical navigation device of claim 2, wherein the processing circuitry is further configured to generate display data for displaying at least one of the drift line, the drift start position, or a combination thereof.

4. The nautical navigation device of claim 2, wherein the processing circuitry is further configured to:
control a rudder of the watercraft to reach at least one of the drift start position and the drift line;
stop the engine of the watercraft in case a location of the watercraft indicates at least one of a drift start location, a position on the drift line, or a combination thereof; and
activate an auto-heading control mode in case the location of the watercraft indicates a location in relation to the destination position has been reached.

5. The nautical navigation device of claim 1, wherein the processing circuitry is further configured to determine a drift time scale in relation to the drift line, based on the external force information.

6. The nautical navigation device of claim 1, wherein the processing circuitry is further configured to:
receive new destination position for the watercraft; and
determine, based on the new destination position and the drift line, a new drift line.

7. The nautical navigation device of claim 6, wherein the processing circuitry is further configured to determine a new drift start position on the new drift line, based on the new destination position, the destination position, the drift start position, and the new drift line.

8. The nautical navigation device of claim 6, wherein the processing circuitry is further configured to:
determine a position of the watercraft;
determine position error information between the destination position and the position of the watercraft; and
determine a modified drift line, based on the determined position error information, the drift line, and the new destination position.

9. The nautical navigation device of claim 8, wherein the processing circuitry is further configured to:
store a drift start position in relation to the destination position; and determine a modified drift start position on the modified drift line, based on the determined position error information, the new destination position, the destination position, the drift start position, and the modified drift line.

10. The nautical navigation device of claim 1, wherein the processing circuitry is further configured to:

receive length information in relation to a length of an anchor chain;

receive depth information in relation to a depth along the drift line; and determine an anchor drop position, based on the destination position, the drift line, the depth information, and the length information.

11. The nautical navigation device of claim 10, wherein the processing circuitry is further configured to generate display data for displaying the anchor drop position on the drift line.

12. The nautical navigation device of claim 1, wherein the processing circuitry is further configured to:

store a nautical chart and depth information, the depth information being obtained from at least one of one or more depth sensors in relation to the watercraft, chart information in relation to the nautical chart, or a combination thereof;

receive length information in relation to a length of an anchor chain; and determine an anchor drop position, based on the destination position, the drift line, the depth information, and the length information.

13. The nautical navigation device of claim 1, wherein the processing circuitry is further configured to determine a heading direction of the watercraft, wherein the heading direction of the watercraft is different from a direction of the drift line.

14. The nautical navigation device of claim 1, wherein the processing circuitry is further configured to:

receive a first position of the watercraft at a first instance of time; and receive a second position of the watercraft at a second instance of time that is different from the first instance of time.

15. The nautical navigation device of claim 1, wherein, to receive the external force information, the processing circuitry is further configured to receive the external force information indicating an amount of at least one external force exerted on the watercraft, the at least one external force including at least one of tidal force, wind force, or a combination thereof.

16. The nautical navigation device of claim 1, wherein the destination position is received from at least one of a user, a sonar device, a database, and one or more Artificial Intelligence (AI) models.

17. A nautical navigation method, comprising:

receiving a destination position for a watercraft;

receiving external force information in relation to the watercraft; and determining, based on the destination position and the external force information, a drift line in relation to a movement of the watercraft to reach the destination position from a specific position in case an engine of the watercraft is stopped or neutral.

18. The nautical navigation method of claim 17, further comprising:

receiving drift time information to reach the destination position on the drift line; and determining a drift start position on the drift line, based on the destination position, the external force information, and the drift time information, wherein the specific position corresponds to the drift start position of the watercraft on the drift line.

19. The nautical navigation method of claim 17, further comprising:

determining a drift time scale in relation to the drift line, based on the external force information.

20. A non-transitory computer readable medium having stored thereon computer-executable instructions which, in case executed by one or more processors, cause a computing device to perform a method that comprises:

receiving a destination position for a watercraft;

receiving external force information in relation to the watercraft; and determining, based on the destination position and the external force information, a drift line in relation to a movement of the watercraft to reach the destination position from a specific position in case an engine of the watercraft is stopped or in neutral.

* * * * *